(12) United States Patent
Su et al.

(10) Patent No.: US 10,602,542 B2
(45) Date of Patent: Mar. 24, 2020

(54) TRANSMISSION OPPORTUNITY DETERMINING METHOD, AND ACCESS POINT (71) Applicant: Huawei Technologies Co., Ltd., Shenzhen (CN)

(72) Inventors: Hongjia Su, Shanghai (CN); Yingpei Lin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/024,165

(22) Filed: Jun. 29, 2018

(65) Prior Publication Data
US 2018/0310336 A1    Oct. 25, 2018

Related U.S. Application Data (63) Continuation of application No. PCT/CN2016/106984, filed on Nov. 23, 2016.

(30) Foreign Application Priority Data

Dec. 31, 2015 (CN) .......................... 2015 1 1032035

(51) Int. Cl.
*H04L 12/28* (2006.01)
*H04W 74/08* (2009.01)
(Continued)

(52) U.S. Cl.
CPC .......... *H04W 74/08* (2013.01); *H04W 72/121* (2013.01); *H04W 84/12* (2013.01); *H04W 88/08* (2013.01)

(58) Field of Classification Search
CPC ..................................................... H04L 12/50
(Continued)

(56) References Cited

U.S. PATENT DOCUMENTS 10,292,116 B2 * 5/2019 Kim .................. H04W 74/0816
2008/0112351 A1    5/2008 Surineni et al.
(Continued)

FOREIGN PATENT DOCUMENTS

CN    101548573 A    9/2009
CN    102958185 A    3/2013
(Continued)

OTHER PUBLICATIONS

"IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications, Amendment 4: Enhancements for Very High Throughput for Operation in Bands below 6 GHz," IEEE Computer Society, pp. 1-425, Std 802.11ac-2013, Institute of Electrical and Electronics Engineers, New York, New York (Approved Dec. 11, 2013).
(Continued)

*Primary Examiner* — Dang T Ton
(74) *Attorney, Agent, or Firm* — Leydig, Voit & Mayer, Ltd.

(57) ABSTRACT

A transmission opportunity determining method and an access point are provided, so as to implement a transmission opportunity determining method for multiuser transmission and further improve multiuser transmission efficiency. The method includes: determining, by an access point, transmission opportunity duration in which the access point performs frame transmission with at least two stations for a plurality of times; and after the access point performs backoff and obtains a channel through contention, and initially sends a downlink frame in the transmission opportunity duration, determining, by the access point, that the access point holds a transmission opportunity in the transmission opportunity duration.

4 Claims, 6 Drawing Sheets

(51) Int. Cl.
*H04W 72/12* (2009.01)
*H04W 84/12* (2009.01)
*H04W 88/08* (2009.01)

(58) Field of Classification Search
USPC ........................................................ 370/329
See application file for complete search history.

(56) References Cited

U.S. PATENT DOCUMENTS

| 2012/0008490 | A1 | 1/2012 | Zhu |
| 2012/0188923 | A1 | 7/2012 | Kwon et al. |
| 2013/0089047 | A1 | 4/2013 | Wentink |

FOREIGN PATENT DOCUMENTS

| CN | 103229562 A | 7/2013 |
| WO | 2015050995 A2 | 4/2015 |
| WO | 2015192070 A1 | 12/2015 |

OTHER PUBLICATIONS

"IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) specifications, Amendment 4: Further Higher Data Rate Extension in the 2.4 GHz Band," IEEE Computer Society, pp. 1-77, Std 802.11g-2003, Institute of Electrical and Electronics Engineers, New York, New York (Approved Jun. 12, 2003).

"IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications, Amendment 5: Enhancements for Higher Throughput," IEEE Computer Society, pp. 1-536, Std 802.11n-2009, Institute of Electrical and Electronics Engineers, New York, New York (Approved Sep. 11, 2009).

* cited by examiner

An access point determines transmission opportunity duration in which the access point performs frame transmission with at least two stations for a plurality of times — S301

After performing backoff and obtaining a channel through contention, and initially sending a downlink frame in the transmission opportunity duration, the access point determines that the access point holds a transmission opportunity in the transmission opportunity duration — S302

FIG. 8

TRANSMISSION OPPORTUNITY DETERMINING METHOD, AND ACCESS POINT

CROSS-REFERENCE TO RELATED APPLICATIONS

This application is a continuation of International Application No. PCT/CN2016/106984, filed on Nov. 23, 2016, which claims priority to Chinese Patent Application No. 201511032035.4, filed on Dec. 31, 2015. The disclosures of the aforementioned applications are hereby incorporated by reference in their entireties.

TECHNICAL FIELD

Embodiments of the present invention relate to the wireless communications field, and in particular, to a transmission opportunity determining method and an access point.

BACKGROUND

Currently, a standard used in a wireless local area network (WLAN for short) is the Institute of Electrical and Electronics Engineers (IEEE for short) 802.11 series. The WLAN may include a plurality of basic service sets (BSS for short). Network nodes in a basic service set include an access point (AP for short) and a station (STA for short). Each basic service set may include one access point and a plurality of stations associated with the access point.

Wireless Fidelity (Wi-Fi for short) operates on an unlicensed frequency band. Specifications in the 802.11ax standard are an extension of those in the conventional 802.11 series. The 802.11ax standard stipulates that both an access point and a station need to contend for a channel to perform data transmission. That is, in the basic service set, the access point or the station can send a transmission frame only after successfully completing a backoff procedure.

Figure 1:
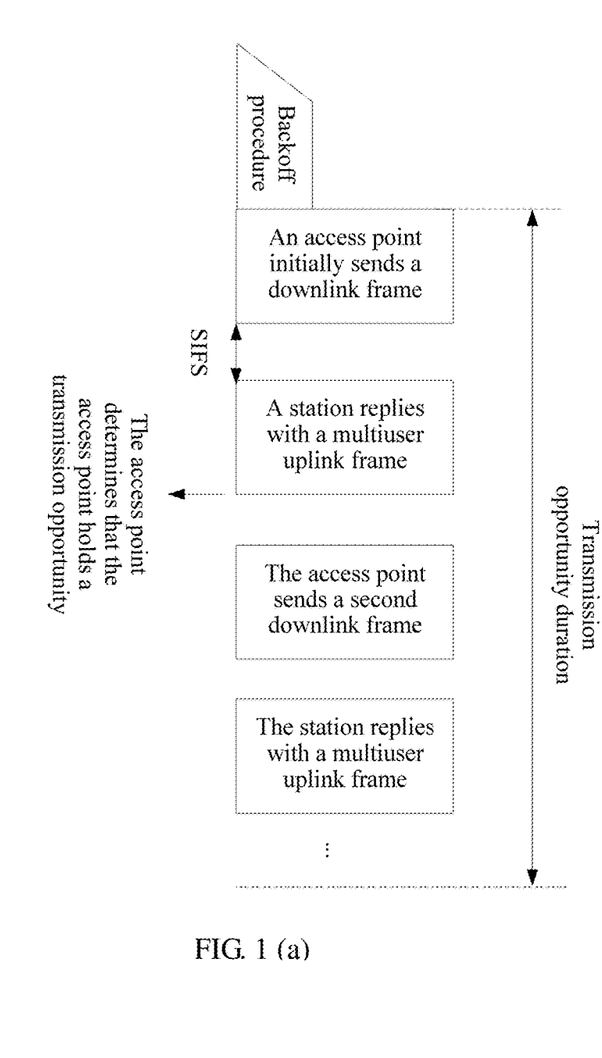

An access point is used as an example of a single-user transmission mechanism. The access point expects to perform frame exchange transmission with a same station for a plurality of times in transmission opportunity (TXOP for short) duration. As shown in FIG. 1 (a), the access point performs backoff and obtains a channel through contention, and initially sends a downlink frame to the station in the transmission opportunity duration. After a short interframe space (SIFS for short, SIFS=16 µs), the station replies to the access point with an uplink frame. In this case, the access point successfully completes an initial frame exchange sequence. The access point determines that the access point holds a transmission opportunity in the transmission opportunity duration. As shown in FIG. 1 (b), if the access point fails the initial frame exchange sequence, the access point cannot hold a transmission opportunity in the transmission opportunity duration. In this case, the access point can send a downlink frame only after performing backoff again and obtaining a channel through contention.

In a dense-station scenario, the access point may perform multiuser-scheduling transmission, to improve system efficiency. However, currently, the standard defines only a transmission opportunity determining method for the single-user transmission mechanism, and does not define a transmission opportunity determining method for a multiuser transmission mechanism. There are a plurality of different stations in transmission opportunity duration in multiuser transmission. The plurality of different stations may have uplink/downlink data requirements of different service types. Therefore, the access point needs to perform uplink and/or downlink multiuser transmission with the plurality of different stations for a plurality of times. In this case, the transmission opportunity determining method for the single-user transmission mechanism is inapplicable to the multiuser transmission mechanism.

SUMMARY

Embodiments of the present invention provide a transmission opportunity determining method and an access point, so as to implement a transmission opportunity determining method for a multiuser transmission mechanism and further improve multiuser transmission efficiency.

According to a first aspect, an embodiment of the present invention provides a transmission opportunity determining method, including:

determining, by an access point, transmission opportunity duration in which the access point performs frame transmission with at least two stations for a plurality of times; and after the access point performs backoff and obtains a channel through contention, and initially sends a downlink frame in the transmission opportunity duration, determining, by the access point, that the access point holds a transmission opportunity in the transmission opportunity duration.

With reference to the first aspect, in a first possible implementation, the method further includes:

after determining that the access point holds the transmission opportunity in the transmission opportunity duration, sending, by the access point, another downlink frame in the transmission opportunity duration.

With reference to the first possible implementation of the first aspect, in a second possible implementation of the first aspect, the access point does not need to perform backoff before sending the another downlink frame in the transmission opportunity duration.

According to a second aspect, an embodiment of the present invention provides an access point, including:

a processing unit, configured to: determine transmission opportunity duration in which the access point performs frame transmission with at least two stations for a plurality of times; and perform backoff; and a transceiver unit, configured to: after the processing unit performs backoff and obtains a channel through contention, initially send a downlink frame in the transmission opportunity duration determined by the processing unit, where the processing unit is further configured to: after the transceiver unit initially sends the downlink frame in the transmission opportunity duration, determine that the access point holds a transmission opportunity in the transmission opportunity duration.

With reference to the second aspect, in a first possible implementation, the transceiver unit is further configured to:

after the processing unit determines that the access point holds the transmission opportunity in the transmission opportunity duration, send another downlink frame in the transmission opportunity duration.

With reference to the first possible implementation of the second aspect, in a second possible implementation of the second aspect, the processing unit does not need to perform backoff before the transceiver unit sends the another downlink frame in the transmission opportunity duration.

According to the transmission opportunity determining method and the access point applied to the multiuser transmission mechanism provided in the embodiments of the present invention, if the access point expects to perform frame transmission with at least two stations for a plurality of times in the transmission opportunity duration, after performing backoff and obtaining a channel through contention, the access point initially sends the downlink frame in the transmission opportunity duration. After initially sending the downlink frame, the access point may determine that the access point holds the transmission opportunity in the transmission opportunity duration. The access point that already holds the transmission opportunity does not need to perform backoff before sending the another downlink frame in the transmission opportunity duration, and therefore multiuser transmission efficiency is improved.

BRIEF DESCRIPTION OF DRAWINGS

FIG. 1 (a) is a schematic diagram of a transmission opportunity determining method for a single-user transmission mechanism;

FIG. 1 (b) is a schematic diagram of a transmission opportunity determining method for a single-user transmission mechanism;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The embodiments of the present invention provide a transmission opportunity determining method and an access point, so as to implement a transmission opportunity determining method for a multiuser transmission mechanism and further improve multiuser transmission efficiency. The method and the apparatus are based on a same inventive concept. Because problem resolving principles of the method and the apparatus are similar, mutual reference may be made to implementation of the method and the apparatus, and no repeated description is provided.

The technical solutions provided in the embodiments of the present invention are applicable to WLANs, and include but are not limited to Wi-Fi systems represented by 802.11ax, 802.11a, 802.11b, 802.11g, 802.11n, and 802.11ac. The WLAN may include a plurality of basic service sets. Network nodes in a basic service set include an access point and a station. Each basic service set may include one access point and a plurality of stations associated with the access point.

Figure 2:
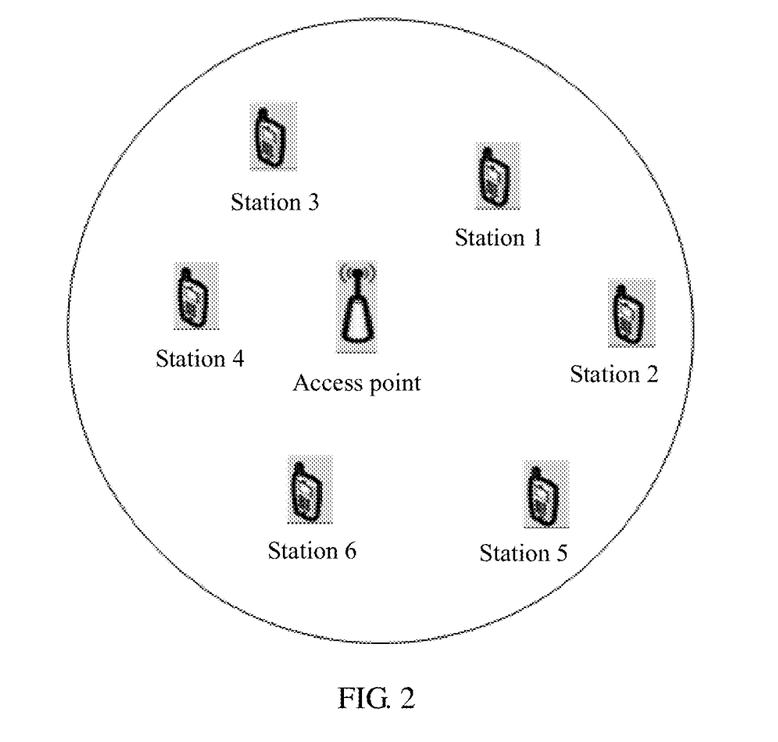
FIG. 2 is a schematic diagram of a network architecture according to an embodiment of the present invention.

The access point in the embodiments of the present invention may also be referred to as a wireless access point, a hotspot, or the like. The access point may be an access point for a mobile user to access a wired network, and is mainly deployed in a home, inside a building, inside a campus, and the like, and a typical coverage radius ranges from tens to hundreds of meters. Certainly, the access point may also be deployed outdoor. The access point is equivalent to a bridge that connects a wired network to a wireless network. A main function of the access point is to connect wireless network clients together and then connect the wireless network to an Ethernet. The access point may be a terminal device or a network device with a Wi-Fi chip. The access point may support a plurality of WLAN standards such as 802.11ax, 802.11ac, 802.11n, 802.11g, 802.11b, and 802.11a. For example, a basic service set shown in FIG. 2 includes an access point and stations 1 to 6 associated with the access point.

The station in the embodiments of the present invention may be a wireless communications chip, a wireless sensor, or a wireless communications terminal. For example, the station may be a mobile phone, a tablet computer, a set-top box, a smart television set, a smart wearable device, an in-vehicle communications device, a computer, or the like that supports a Wi-Fi communication function. The station may support a plurality of WLAN standards such as 802.11ax, 802.11ac, 802.11n, 802.11g, 802.11b, and 802.11a.

Currently, a standard defines only a transmission opportunity determining method for a single-user transmission mechanism, and does not define a transmission opportunity determining method for the multiuser transmission mechanism. If the multiuser transmission mechanism uses a method same as the transmission opportunity determining method for the single-user transmission mechanism to determine a transmission opportunity, in the multiuser transmission mechanism, the access point expects to perform a plurality of frame transmission sequences with at least two stations in transmission opportunity duration. If the access point fails an initial frame exchange sequence in the transmission opportunity duration, the access point cannot determine that the access point holds a transmission opportunity. The access point can send a next downlink frame only after performing backoff again and obtaining a channel through contention, resulting in relatively low multiuser transmission efficiency. A problem of low multiuser transmission efficiency is even severer in a dense-station scenario. Therefore, the transmission opportunity determining method for the single-user transmission mechanism is inapplicable to the multiuser transmission mechanism.

An embodiment of the present invention provides a transmission opportunity determining method applied to the multiuser transmission mechanism. In the technical solutions provided in the embodiments of the present invention, if an access point expects to perform frame transmission with at least two stations for a plurality of times in transmission opportunity duration, after performing backoff and obtaining a channel through contention, the access point initially sends a downlink frame in the transmission opportunity duration. After initially sending the downlink frame, the access point can determine that the access point holds a transmission opportunity in the transmission opportunity duration. An access point that already holds a transmission opportunity does not need to perform backoff before sending another downlink frame in the transmission opportunity duration, and therefore multiuser transmission efficiency is improved.

The technical solutions provided in the embodiments of the present invention are applicable to the multiuser transmission mechanism. The technical solutions provided in the embodiments of the present invention enable the access point to determine that the access point holds a transmission opportunity in multiuser transmission, and therefore multiuser transmission efficiency is improved. The multiuser transmission mechanism indicates that at least two stations perform frame transmission with the access point in transmission opportunity duration, and the access point performs frame transmission for a plurality of times in the transmission opportunity duration. In the embodiments of the present invention, multiuser transmission may be implemented by using technologies such as orthogonal frequency division multiple access (OFDMA for short) and multi-user multiple-input multiple-output (MU-MIMO for short).

The following describes in detail the technical solutions provided in the embodiments of the present invention.

Figure 3:
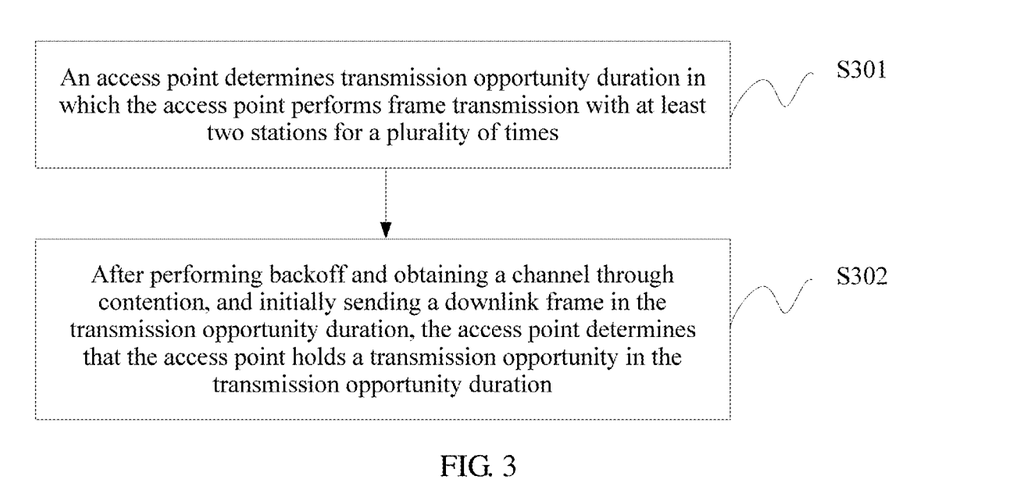
FIG. 3 is a schematic flowchart of a transmission opportunity determining method according to an embodiment of the present invention.

As shown in FIG. 3, an embodiment of the present invention provides a transmission opportunity determining method, including:

S301. An access point determines transmission opportunity duration in which the access point performs frame transmission with at least two stations for a plurality of times.

S302. After performing backoff and obtaining a channel through contention, and initially sending a downlink frame in the transmission opportunity duration, the access point determines that the access point holds a transmission opportunity in the transmission opportunity duration.

In this embodiment of the present invention, the access point expects to perform frame transmission for a plurality of times in transmission opportunity duration of the access point. In addition, at least two stations perform frame transmission with the access point in the transmission opportunity duration. That is, the access point expects to perform a plurality of frame exchange sequences with the at least two stations in the duration of the transmission opportunity of the access point. This indicates that this embodiment of the present invention can be applied to a multiuser transmission mechanism.

After a transmit end successfully sends a first frame to a receive end, the receive end successfully replies, after SIFS duration, to the transmit end with a second frame in response to the first frame. This process is one frame exchange sequence. In this embodiment of the present invention, after the access point sends a downlink frame to the station, the station sends, to the access point after SIFS duration, an uplink frame in response to the downlink frame of the access point. This process is referred to as one frame exchange sequence.

The access point determines the transmission opportunity duration in which the access point performs frame transmission with the at least two stations for a plurality of times. The duration is duration used by the access point to perform frame transmission with the at least two stations for the plurality of times. The transmission opportunity duration that is determined by the access point and in which the access point performs frame transmission with the at least two stations for a plurality of times includes but is not limited to: duration for sending a plurality of downlink frames by the access point, duration for sending uplink frames by the at least two stations in response to the downlink frames of the access point, and a time interval between a plurality of frames.

In this embodiment of the present invention, after performing backoff and obtaining a channel through contention, the access point becomes a transmission opportunity initiator (TXOP Initiator). After initially sending the downlink frame in the transmission opportunity duration, the access point determines that the access point holds the transmission opportunity in the transmission opportunity duration. That is, the access point determines that the access point becomes a transmission opportunity holder (TXOP Holder) in the transmission opportunity duration. The access point keeps occupying a communications medium in the transmission opportunity duration. An access point that already holds a transmission opportunity does not need to perform backoff before sending a downlink frame.

After the access point determines that the access point holds the transmission opportunity in the transmission opportunity duration, the access point sends another downlink frame in the transmission opportunity duration, so that the access point performs a plurality of frame exchange sequences with the at least two stations in the transmission opportunity duration. The access point does not need to perform backoff before sending the another downlink frame in the transmission opportunity duration. Even if the access point fails an initial frame exchange sequence, the access point can send another downlink frame without performing backoff again and obtaining a channel through contention, and therefore transmission efficiency is improved.

Specifically, after initially sending the downlink frame in the transmission opportunity duration, the access point determines that the access point holds the transmission opportunity in the transmission opportunity duration. The access point may send a second downlink frame at a moment, where a time interval between the moment and a moment at which the access point initially sends the downlink frame is greater than short interframe space (SIFS for short, SIFS=16 µs) duration and less than distributed interframe spacing (DIFS for short, DIFS=34 µs) duration. For example, in the transmission opportunity duration, a time interval between a moment at which the access point initially sends the downlink frame and a moment at which the access point sends a second downlink frame is a point interframe space (PIFS for short, PIFS=25 µs).

Optionally, in the transmission opportunity duration, if the access point fails a frame exchange sequence, the access point may send a next downlink frame at a moment, where a time interval between the moment and a moment at which the access point currently sends a downlink frame is greater than the SIFS duration and less than the DIFS duration.

Optionally, the downlink frame initially sent by the access point in the transmission opportunity duration carries the transmission opportunity duration. The transmission opportunity duration is carried in a duration field in a Medium Access Control (MAC for short) header field in the downlink frame.

Optionally, the downlink frame initially sent by the access point in the transmission opportunity duration may be a trigger frame. The trigger frame is used to trigger the station to perform multiuser uplink transmission. The trigger frame may carry an identifier of the station that is triggered to perform multiuser uplink transmission, resource indication information, physical layer information of the station, and the like. For example, the identifier of the station may be an association identifier (AID for short) of the station. The resource indication information may include resource unit allocation, spatial stream allocation, and the like. The physical layer information of the station may include a modulation and coding scheme, and the like.

Figure 4:
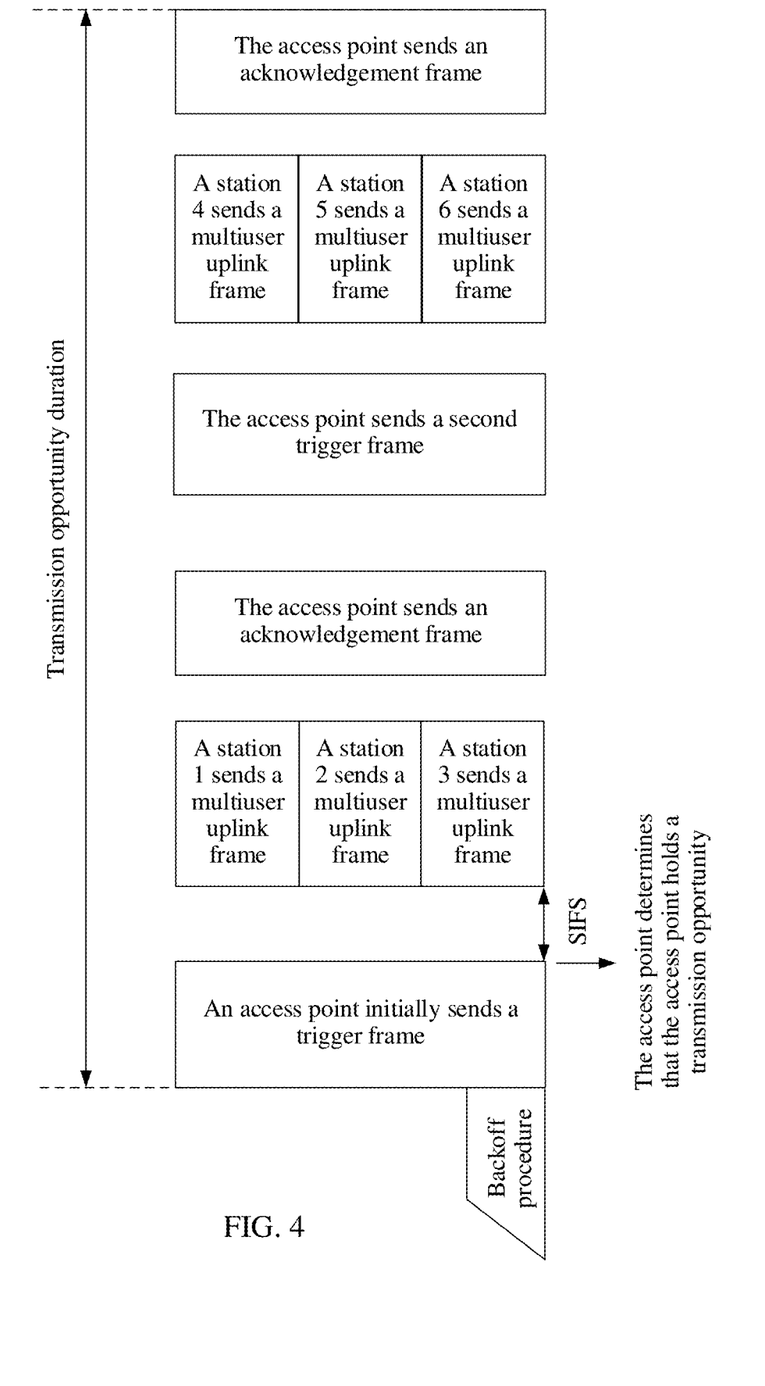
FIG. 4 is a schematic diagram of multiuser uplink transmission according to an embodiment of the present invention.

An example (1) is used for description. Referring to a network architecture shown in FIG. 2, the access point expects to schedule stations 1 to 6 to perform multiuser uplink transmission. As shown in FIG. 4, a process in which the access point implements multiuser uplink transmission by using the technical method provided in this embodiment of the present invention is as follows.

In FIG. 4, after performing backoff and obtaining a channel through contention, the access point initially sends a trigger frame in the transmission opportunity duration. In this case, the access point determines that the access point holds a transmission opportunity in the transmission opportunity duration. The trigger frame initially sent by the access point is used to trigger the station 1, the station 2, and the station 3 to send a multiuser uplink frame. After a SIFS, the station 1, the station 2, and the station 3 reply to the access point with a multiuser uplink frame. The access point replies to the station 1, the station 2, and the station 3 with an acknowledgement (ACK for short) frame. At this point, the access point completes the initial frame exchange sequence. The access point sends a second trigger frame. The second trigger frame is used to trigger the station 4, the station 5, and the station 6 to send a multiuser uplink frame. After a SIFS, the station 4, the station 5, and the station 6 reply to the access point with a multiuser uplink frame, and the access point replies to the station 4, the station 5, and the station 6 with an ACK frame.

Figure 5:
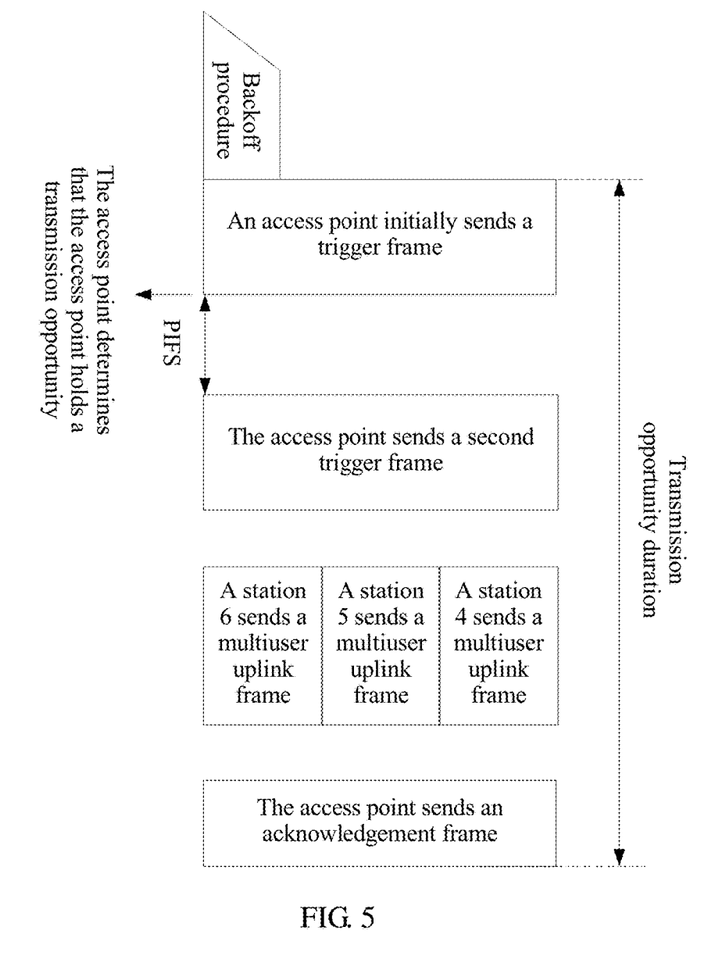
FIG. 5 is a schematic diagram of multiuser uplink transmission according to an embodiment of the present invention.

An example (2) is used for description. Referring to the network architecture shown in FIG. 2, the access point expects to schedule the stations 1 to 6 to perform multiuser uplink transmission. As shown in FIG. 5, a process in which the access point implements multiuser uplink transmission by using the technical method provided in this embodiment of the present invention is as follows.

In FIG. 5, after performing backoff and obtaining a channel through contention, the access point initially sends a trigger frame in the transmission opportunity duration. In this case, the access point determines that the access point holds a transmission opportunity in the transmission opportunity duration. The trigger frame initially sent by the access point is used to trigger the station 1, the station 2, and the station 3 to send a multiuser uplink frame. In continuous PIFS duration, if the access point does not receive a multiuser uplink frame with which the station 1, the station 2, and the station 3 reply to the access point, and the channel is in an idle state, it indicates that the access point fails the initial frame exchange sequence. After PIFS duration that follows the initial sending of the trigger frame by the access point, the access point does not need to perform backoff. The access point directly sends a second trigger frame. The second trigger frame is used to trigger the station 4, the station 5, and the station 6 to send a multiuser uplink frame. After a SIFS, the station 4, the station 5, and the station 6 reply to the access point with a multiuser uplink frame, and the access point replies to the station 4, the station 5, and the station 6 with an ACK frame.

Figure 6:
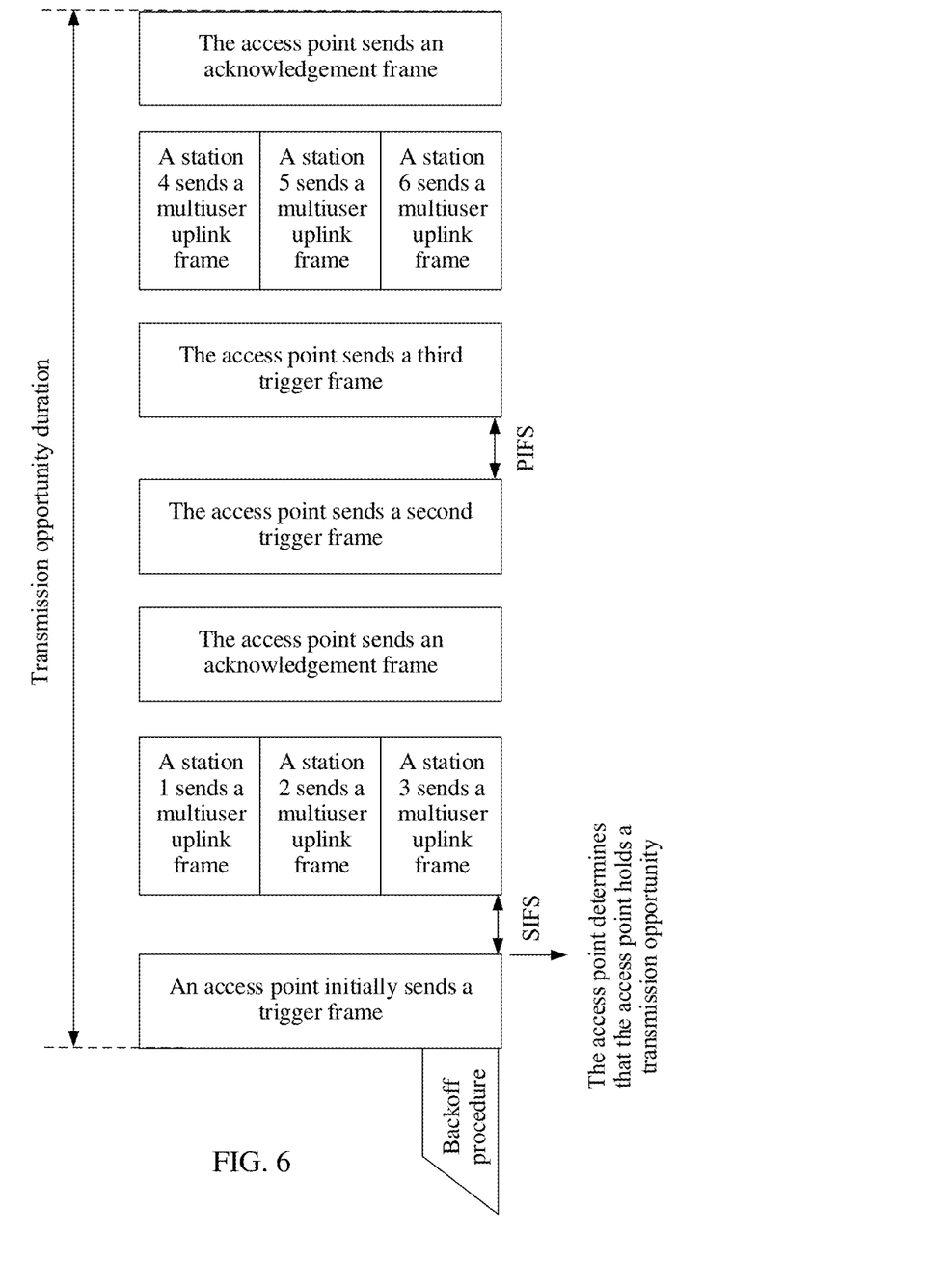
FIG. 6 is a schematic diagram of multiuser uplink transmission according to an embodiment of the present invention.

An example (3) is used for description. Referring to the network architecture shown in FIG. 2, the access point expects to schedule the stations 1 to 6 to perform multiuser uplink transmission. As shown in FIG. 6, a process in which the access point implements multiuser uplink transmission by using the technical method provided in this embodiment of the present invention is as follows.

In FIG. 6, after performing backoff and obtaining a channel through contention, the access point initially sends a trigger frame in the transmission opportunity duration. In this case, the access point determines that the access point holds a transmission opportunity in the transmission opportunity duration. The trigger frame initially sent by the access point is used to trigger the station 1, the station 2, and the station 3 to send a multiuser uplink frame. After a SIFS, the station 1, the station 2, and the station 3 reply to the access point with a multiuser uplink frame. The access point replies to the station 1, the station 2, and the station 3 with an ACK frame. At this point, the access point completes the initial frame exchange sequence. The access point sends a second trigger frame. The second trigger frame is used to trigger the station 4, the station 5, and the station 6 to send a multiuser uplink frame. In continuous PIFS duration, if the access point does not receive a multiuser uplink frame with which the station 4, the station 5, and the station 6 reply to the access point, and the channel is in an idle state, it indicates that the access point fails a second frame exchange sequence. After PIFS duration following the sending of the second trigger frame by the access point, the access point does not need to perform backoff. The access point directly sends a third trigger frame. The third trigger frame may have a function same as that of the second trigger frame, and is used to trigger the station 4, the station 5, and the station 6 to send a multiuser uplink frame. After a SIFS, the station 4, the station 5, and the station 6 reply to the access point with a multiuser uplink frame, and the access point replies to the station 4, the station 5, and the station 6 with an ACK frame.

A difference among the example (1), the example (2), and the example (3) lies in: The access point successfully performs the initial frame exchange sequence in the transmission opportunity duration in the example (1), the access point fails the initial frame exchange sequence in the transmission opportunity duration in the example (2), and in the example (3), the access point successfully performs the initial frame exchange sequence in the transmission opportunity duration, but fails the frame exchange sequence after the initial frame exchange sequence.

According to the transmission opportunity determining method applied to the multiuser transmission mechanism provided in this embodiment of the present invention, if the access point expects to perform frame transmission with at least two stations for a plurality of times in the transmission opportunity duration, after performing backoff and obtaining a channel through contention, the access point initially sends the downlink frame in the transmission opportunity duration. After initially sending the downlink frame, the access point may determine that the access point holds the transmission opportunity in the transmission opportunity duration. The access point that already holds the transmission opportunity does not need to perform backoff before sending another downlink frame in the transmission opportunity duration, and therefore multiuser transmission efficiency is improved.

Figure 7:
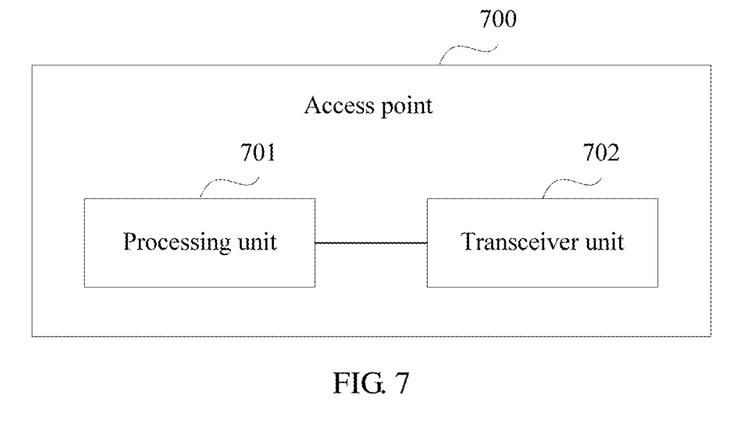
FIG. 7 is a schematic structural diagram of an access point according to an embodiment of the present invention.

Based on the foregoing embodiments, an embodiment of the present invention further provides an access point. The access point may use the method provided in the embodiment corresponding to FIG. 3. As shown in FIG. 7, an access point 700 includes a processing unit 701 and a transceiver unit 702.

The processing unit 701 is configured to: determine transmission opportunity duration in which the access point 700 performs frame transmission with at least two stations for a plurality of times; and perform backoff.

The transceiver unit 702 is configured to: after the processing unit 701 performs backoff and obtains a channel through contention, initially send a downlink frame in the transmission opportunity duration determined by the processing unit 701.

The processing unit 701 is further configured to: after the transceiver unit 702 initially sends the downlink frame in the transmission opportunity duration, determine that the access point 700 holds a transmission opportunity in the transmission opportunity duration.

Optionally, the transceiver unit 702 is further configured to:

after the processing unit 701 determines that the access point 700 holds the transmission opportunity in the transmission opportunity duration, send another downlink frame in the transmission opportunity duration.

Optionally, the processing unit 701 does not need to perform backoff before the transceiver unit 702 sends the another downlink frame in the transmission opportunity duration.

It should be noted that the unit division in the embodiments of the present invention is an example, and is only logical function division. There may be another division manner in an actual implementation. In addition, functional units in the embodiments of this application may be integrated into one processor, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional art, or all or a part of the technical solutions may be implemented in a form of a software product. The software product is stored in a storage medium and includes several instructions for instructing a computer device (which may be a personal computer, a server, or a network device) or a processor to perform all or a part of the steps of the methods in the embodiments of this application. The foregoing storage medium includes any medium that can store program code, such as a USB flash drive, a removable hard disk, a read-only memory (ROM), a random access memory (RAM), a magnetic disk, or a compact disc.

Figure 8:
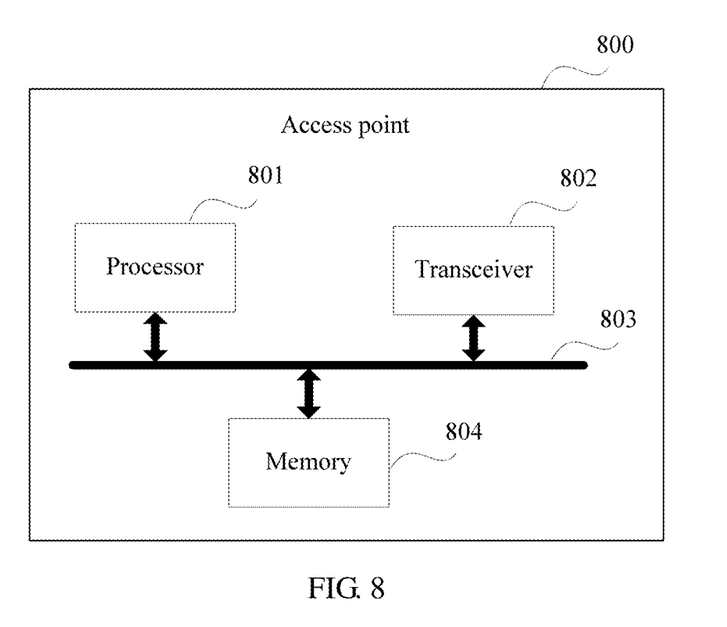
FIG. 8 is a schematic structural diagram of an access point according to an embodiment of the present invention.

Based on the foregoing embodiments, an embodiment of the present invention further provides an access point. The access point may use the method provided in the embodiment corresponding to FIG. 3, and may be a device same as the access point shown in FIG. 7. As shown in FIG. 8, an access point 800 includes a processor 801, a transceiver 802, a bus 803, and a memory 804.

The processor 801, the transceiver 802, and the memory 804 are interconnected by using the bus 803. The bus 803 may be a peripheral component interconnect (PCI for short) bus, an extended industry standard architecture (EISA for short) bus, or the like. The bus may be classified into an address bus, a data bus, a control bus, and the like. For ease of representation, only one thick line is used to represent the bus in FIG. 8, but this does not mean that there is only one bus or only one type of bus.

The processor 801 is corresponding to the processing unit 701 in FIG. 7, and the transceiver 802 is corresponding to the transceiver unit 702 in FIG. 7. The access point 800 further includes the memory 804, configured to store a program, and the like. Specifically, the program may include program code, and the program code includes a computer operation instruction. The memory 804 may include a random access memory (RAM), and may further include a nonvolatile memory, for example, at least one magnetic disk storage. The processor 801 executes the application program stored in the memory 804, to implement the foregoing transmission opportunity determining method.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention. Obviously, persons skilled in the art can make various modifications and variations to the embodiments of the present invention without departing from the scope of the embodiments of the present invention. The present invention is intended to cover these modifications and variations to the embodiments of the present invention, provided that they fall within the scope of protection defined by the following claims and their equivalent technologies.

What is claimed is:

1. A transmission opportunity determining method comprising:
   determining, by an access point, a transmission opportunity duration in which the access point performs frame transmission with at least two stations for a plurality of times;
   performing backoff, by the access point, and obtaining a channel through contention;
   initially sending, by the access point, a first downlink frame in the transmission opportunity duration, wherein the first downlink frame is a trigger frame for triggering a station to perform multiuser uplink transmission;
   upon sending the first downlink frame, determining, by the access point, that the access point holds a transmission opportunity in the transmission opportunity duration; and
   sending, by the access point, a second downlink frame in the transmission opportunity duration after determining that the access point holds the transmission opportunity in the transmission opportunity duration,
   wherein the access point does not perform backoff before sending the second downlink frame in the transmission opportunity duration when the access point does not receive a multiuser uplink frame in reply to the first downlink frame.

2. An access point comprising:
   a processor configured to determine a transmission opportunity duration in which the access point performs frame transmission with at least two stations for a plurality of times, perform backoff, and obtain a channel through contention;
   a transmitter configured to cooperate with the processor in order to, after the processor performs backoff and obtains the channel through contention, initially send a first downlink frame in the transmission opportunity duration, wherein the first downlink frame is a trigger frame for triggering a station to perform multiuser uplink transmission;
   the processor is further configured to, after the transmitter initially sends the downlink frame in the transmission opportunity duration, determine that the access point holds a transmission opportunity in the transmission opportunity duration; and the transmitter is further configured to cooperate with the processor to send a second downlink frame in the transmission opportunity duration after determining that the access point holds the transmission opportunity in the transmission opportunity duration, wherein the processor does not need to perform backoff before cooperating with the transmitter to send the second downlink frame in the transmission opportunity duration when a multiuser uplink frame is not received in reply to the first downlink frame.

3. A computer program product comprising non-transitory computer readable medium storing program codes perform the method of claim 1.

4. A non-transitory computer readable medium comprising processor-executable instructions for use by an access point, wherein the instructions when executed by a processor cause the processor to implement operations of determining transmission opportunity, the operations include:

determining a transmission opportunity duration in which the access point performs frame transmission with at least two stations for a plurality of times;

performing backoff and obtaining a channel through contention;

initially sending, a first downlink frame in the transmission opportunity duration, wherein the first downlink frame is a trigger frame for triggering a station to perform multiuser uplink transmission;

upon sending the first downlink frame, determining, that the access point holds a transmission opportunity in the transmission opportunity duration; and sending a second downlink frame in the transmission opportunity duration after determining that the access point holds the transmission opportunity in the transmission opportunity duration, wherein backoff is not performed before sending the second downlink frame in the transmission opportunity duration when a multiuser uplink frame is not received in reply to the first downlink frame.

\* \* \* \* \*